March 6, 1945. A. G. CRONINGER 2,370,843
SUPPORTING ATTACHMENT FOR BIFOCAL SPECTACLES
Filed July 9, 1942
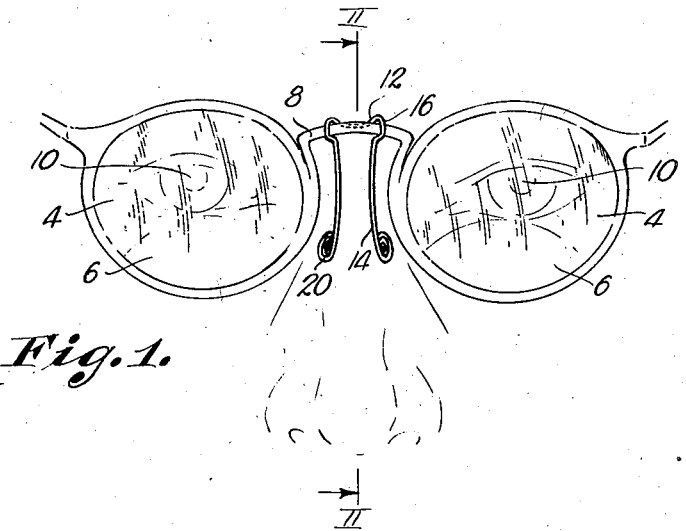
Fig. 1.
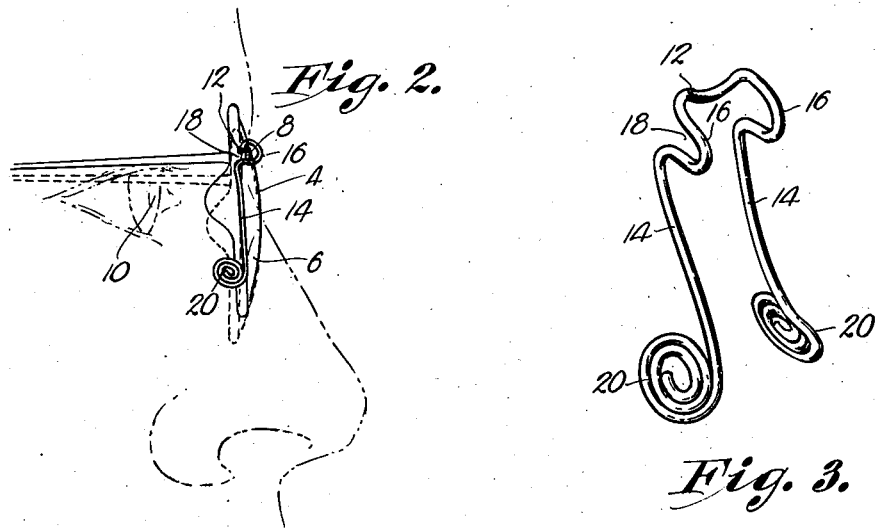
Fig. 2.
Fig. 3.
INVENTOR.
Arthur G. Croninger
BY
ATTORNEY.

Patented Mar. 6, 1945

2,370,843

UNITED STATES PATENT OFFICE 2,370,843

SUPPORTING ATTACHMENT FOR BIFOCAL SPECTACLES

Arthur G. Croninger, Miami, Okla.

Application July 9, 1942, Serial No. 450,272

7 Claims. (Cl. 88—51)

This invention relates to attachments for bifocal spectacles and has for its primary object, the provision of a light, unitary, quickly placeable means for holding the lenses of the spectacles in a position elevated above the normal where the insert of the lenses will be more closely in alignment with the pupils of the eyes.

Another important aim of this invention is the provision of a new article of manufacture in the nature of a supplemental supporting element for bifocal spectacles, which supporting element may be expeditiously positioned and removed from operative relation without manipulating clamps, springs, clasps or other mechanical parts.

This invention has for a yet further aim to provide an attachment for bifocal spectacles, which attachment is formed to present means to engage the bridge of the spectacles and unique elements for resting upon the nose of the wearer, which elements may be manipulated to increase or decrease the length of the attachment whereby the desired position of the spectacle insert may be enjoyed without the necessity of changing the attachment and without the inclusion therein of objectionable, complicated and heavy component elements.

A yet further object of the instant invention is to provide an attachment for bifocal spectacles which comprises a unitary U-shaped wire body, bent to present an open loop in each leg adjacent the bight, and a coiled portion at the free end of each leg, which loops receive the bridge of the spectacles while the coiled portions engage the nose of the wearer and are disposed in diverging planes to one side of the major plane of the unitary body while the said loops are disposed to the opposite side thereof.

It is well-known in the art that the wearing of bifocal lenses presents problems to those required to do close reading. Usually the insert of a bifocal lens is that which must be employed when reading fine type or the like and where such reading extends to a prolonged period of time, the unnatural tilt to the head, with respect to the copy, becomes irksome and tiresome. The attachment contemplated by this invention is for temporary use when it is desired to dispose the reading portion or insert of the bifocal lenses in a position more directly in line between the pupils of the eyes and the copy. The attachment may be quickly applied and as expeditiously removed. As designed, the same is light, will not indicate its presence by an uncomfortable reaction to the wearer but will effectively maintain the bifocal spectacles in the position desired.

The form of the attachment chosen to embody the present invention is illustrated in the accompanying drawing, wherein:

Fig. 1 is a front elevational view of a supporting attachment for bifocal spectacles, showing the same in the operative position.

Fig. 2 is a vertical sectional view taken on line II—II of Fig. 1 indicating in dotted lines, the normal position of the spectacles; and Fig. 3 is a perspective view of the supporting attachment entirely removed from association with the bifocal spectacles.

The type of spectacles with which the attachment is particularly useful, is as shown in Figs. 1 and 2. Said spectacles comprise lenses 4, having inserts 6 and interconnected by the conventional bridge 8. The pupils 10 of the eyes of the wearer may be brought into more perfect alignment with the inserts 6 when the attachment is disposed as shown in Fig. 1, and in full lines of Fig. 2.

The attachment per se comprises a U-shaped body of wire including a bight 12 and supporting members or legs 14. Each leg 14 is kinked adjacent to bight 12 to form a loop 16 extending to one side of the major plane of legs 14.

Bight 12 is arched and each loop 16 is open to present an entrance throat 18, which throat is narrower than the diameter of the loop. These loops 16 are in alignment and lie in planes that diverge outwardly to a slight degree. The free ends of legs 14 are coiled as illustrated.

Coils 20 present supporting pads which lie on each side of the nose of the wearer and in the event it is necessary to increase the length of legs 14, these coils may be unwound to the slightest desired degree. In unwinding the coils, more of legs 14 are left in a straight condition and therefore, proper adjustment with respect to the height of bridge 8, and therefore, the relation between inserts 6 and the pupils 10 of the eyes of the wearer, may be accomplished.

Coils 20 are substantially at right angles to the major plane of the U-shaped body and to one side thereof opposite to that side where lie the loops 16. Due to the angularity of the nose at the point where coils 20 must contact, these coils are preferably in outwardly diverging planes, the angularity of which may be easily changed by the wearer.

It has been found in practice that raising the lenses 4 from 1/8 in. to 1/4 in. will be sufficient to bring inserts 6 into more comfortable alignment. The spectacles need not be removed when the attachment is placed, it only being necessary to lift the spectacles with one hand while the loops 16 are dropped over bridge 8 with the other. When this is done, the legs 14 are extended outwardly in substantially a horizontal plane but are easily thereafter swung to the operative position around bridge 8 as an axis so that coiled portions 20 of legs 14, forming supporting pads, are brought into engagement with the nose.

Observing Fig. 2 indicates the manner in which the specially formed loops 16 practically circumscribe bridge 8 and confine the same against accidental displacement. The relatively narrow throat 18 may be narrower than the width of bridge 8, and if so, the attachment must be moved to a place where the bridge is inserted with ease.

When the attachment is in use, the spectacles assume the position shown in full lines of Fig. 2; when not in use, the spectacles are in the position shown in dotted lines of Fig. 2; and therefore, the relatively strong inserts of lenses 4 are appreciably below the normal line of vision between the pupils of the eyes of the wearer and the matter being viewed.

The way in which the objects of the invention are fulfilled; the manner of constructing the new article of manufacture; the way in which the same may be manually manipulated to adjust its size to peculiar needs; and the method of attaching and removing, have been made clear in the foregoing specification, and while but the preferred form of the invention is illustrated and described, it is desired to be limited only by the scope of the appended claims.

Having thus described the invention, what is claimed as new and desired to be secured by Letters Patent is:

1. As a new article of manufacture, a supporting attachment for bifocal spectacles comprising a U-shaped body provided with an open loop in each leg thereof adjacent the bight of the body, and a supporting pad at the free ends of the legs of the body, said pads comprising a coiled length of each of said legs, said pads being flat and disposed in diverging planes to one side of the major plane of the legs of the U-shaped body, said open loops extending to the opposite side of the major plane of the legs of the U-shaped body.

2. An attachment for bifocal spectacles comprising a unitary, U-shaped wire body having a bight and legs, said body being bent to provide an open loop in each leg adjacent to the bight, and a coiled portion at the ends of the legs, said coiled portions being flat and extending laterally to one side of the legs of the body, said open loops extend'ng to the opposite side of the legs, said loops being in alignment to receive the bridge of the spectacles, said coiled portions being in diverging planes to engage the nose of the wearer.

3. A supporting attachment for bifocal spectacles having a lens insert and a bridge interconnecting the lenses thereof, comprising a body having a forwardly offset upper portion terminating in a rearwardly directed end to form an open loop for receiving said bridge; and spaced apart supporting members on the lower end of the body for engaging the sides of the wearer's nose, the loop being spaced from the supporting members a distance such that when the loop engages the bridge of the spectacles, the inserts are disposed in the direct line of vision.

4. A supporting attachment for bifocal spectacles having a lens insert and a bridge interconnecting the lenses thereof, comprising a body having a forwardly offset upper portion terminating in a rearwardly and downwardly directed end to form an open loop for receiving said bridge; and spaced apart supporting members on the lower end of the body for engaging the sides of the wearer's nose, the loop being spaced from the members a distance such that when the loop engages the bridge of the spectacles the inserts are disposed in the direct line of vision.

5. A supporting attachment for bifocal spectacles having a lens insert and a bridge interconnecting the lenses thereof, comprising a body having a forwardly offset upper portion terminating in an upwardly and rearwardly directed end to form an open loop for receiving said bridge; and spaced apart supporting members on the lower end of the body said body being adjustable as to length to be quickly fitted on the wearer where the lens inserts are in the direct line of vision of the wearer when the supporting members are resting on the nose and the bridge of the spectacles is in the open loop.

6. As a new article of manufacture, a supporting attachment for bifocal spectacles having lens inserts and a bridge, said attachment comprising a U-shaped body provided with an open loop in each leg thereof adjacent to the bight of the body, and a supporting pad at the free ends of the legs of the body to engage the sides of the nose of the wearer, said loops being spaced from the pads on the legs a distance such that when the loops engage the bridge of the bifocal spectacles, the inserts are disposed in the direct line of vision.

7. As a new article of manufacture, a supporting attachment for bifocal spectacles having lens inserts and a bridge, said attachment comprising a U-shaped body provided with an open loop in each leg thereof adjacent to the bight of the body, and a supporting pad at the free ends of the legs of the body to engage the sides of the nose of the wearer, said loops being spaced from the pads on the legs a distance such that when the loops engage the bridge of the bifocal spectacles, the inserts are disposed in the direct line of vision, said pads on the legs comprising a coiled length of each of said legs, the length of said legs being alterable by manipulating the coiled length thereof.

ARTHUR G. CRONINGER.